Patented July 15, 1952

2,603,644

UNITED STATES PATENT OFFICE 2,603,644

VAT DYESTUFFS OF THE PYRANTHRONE SERIES

Karl Saftien and Anton Vilsmeier, Ludwigshafen-on-the-Rhine, Germany

No Drawing. Application December 29, 1949, Serial No. 135,838. In Germany October 1, 1948

4 Claims. (Cl. 260—274)

The present invention relates to new vat dyestuffs of the pyranthrone series which are valuable for dyeing different kinds of textiles and other materials.

We have found that valuable vat dyestuffs of the pyranthrone series are obtained by condensing halogen pyranthrones with 1-aminoanthraquinone-2-aldehyde.

Among the halogen pyranthrones, the di- to tetra-halogen pyranthrones, which are readily accessible commercially, are especially suitable, but still more highly halogenated pyranthrones may also be used for the process. The employment of bromo-pyranthrones is especially advantageous.

The reaction is carried out in inert solvents or diluents in the presence of acid-binding agents, such as sodium or potassium carbonate, and of copper or copper compounds, such as copper oxide. In some cases it is advantageous to use copper oxide alone which has an acid-binding as well as a catalytic action.

There are thus obtained vat dyestuffs having excellent fastness properties and which give red-brown to violet-tinged brown shades depending on the ratio of halogen pyranthrone to 1-aminoanthraquinone-2-aldehyde employed.

The exact constitution of the new products has not been hitherto established. However, we know that the new dyestuffs are not simple imides, but probably belong to the acridine series.

The following examples will further illustrate the invention but the invention is not limited to these examples. The parts are by weight.

Example 1

A mixture of 55 parts (1.1 mols) of 1-aminoanthraquinone-2-aldehyde and 21 parts of copper oxide is introduced while stirring into a mixture, heated to 150° C., of 113 parts (1 mol) of dibromo-pyranthrone (prepared according to U. S. Patent 955,105), 1340 parts of naphthalene and 42 parts of anhydrous sodium carbonate, and the whole is heated to boiling until 1-aminoanthraquinone-2-aldehyde can no longer be detected. The whole is then allowed to cool to 120° C., diluted with monochlorbenzene and filtered by suction at 90° C. The residue is freed from adherent solvent and inorganic compounds by known methods. The dried dyestuff is a dark powder which dissolves in concentrated sulphuric acid to give a blue coloration. The dyestuff dyes cotton well-covering red-brown shades of excellent fastness properties from a red-violet vat.

Dyestuffs having similar properties are obtained by using dichloropyranthrone or chlorobromopyranthrone instead of dibromopyranthrone.

Example 2

A mixture of 130 parts (2.6 mols) of 1-aminoanthraquinone-2-aldehyde and 43 parts of copper oxide is introduced while stirring into a mixture, heated to 150° C., of 113 parts (1 mol) of dibromopyranthrone, 1340 parts of naphthalene and 64 parts of anhydrous sodium carbonate and the whole is heated to boiling until dibromopyranthrone can no longer be detected. After working up in the manner described in Example 1 there is obtained a dark powder which dissolves in concentrated sulphuric acid to give a grey-blue coloration. The dyestuff dyes cotton very fast currant-brown shades from a reddish violet vat. It is especially suitable for printing cotton and for coloring viscose solutions which are to be worked up into artificial silk.

Example 3

A mixture of 55 parts (1.1 mols) of 1-aminoanthraquinone-2-aldehyde and 21 parts of copper oxide is introduced while stirring into a mixture, heated to 150° C., of 128 parts (1 mol) of tribromopyranthrone (prepared according to U. S. Patent 955,105), 1340 parts of naphthalene and 42 parts of anhydrous sodium carbonate, and the whole is heated to boiling while stirring until 1-aminoanthraquinone-2-aldehyde can no longer be detected. After working up in the usual manner, a dyestuff is obtained which dyes cotton powerful red-brown shades from a red-violet vat.

By using 2 mols of 1-aminoanthraquinone-2-aldehyde for each mol of tribromopyranthrone, a vat dyestuff is obtained which dissolves in concentrated sulphuric acid to give an olive-green coloration and dyes cotton from a red-violet vat currant-brown shades, and by using 3 mols of 1-aminoanthraquinone-2-aldehyde the vat dyestuff obtained dyes cotton greyish-brown shades.

More highly halogenated pyranthrones may also be reacted with one or more mols of 1-aminoanthraquinone-2-aldehyde in the same way. Vat dyestuffs are thus obtained which dye cotton red-brown to grey-brown shades.

Example 4

A mixture of 10 parts of 1-aminoanthraquinone-2-aldehyde and 4.2 parts of copper oxide is introduced while stirring into a mixture, heated to 150° C., of 260 parts of naphthalene, 18 parts of chloropyranthrone having a chlorine content of 12.5 per cent (obtained by the reaction of sulphuryl chloride on pyranthrone in nitrobenzene in the presence of iodine) and 8.4 parts of anhydrous sodium carbonate and the whole is heated to boiling until initial material can no longer be detected. After working up in the manner described in Example 1, a dark powder is obtained which dissolves in concentrated sulphuric acid giving a blue coloration. The dyestuff dyes cotton powerful yellow-brown shades of excellent fastness properties from a red-violet vat.

Example 5

A mixture of 21.6 parts (2.2 mols) of 1-aminoanthraquinone-2-aldehyde and 8.6 parts of copper oxide is introduced into a mixture, heated to 150° C., of 358 parts of naphthalene, 21.8 parts (1 mol) of tetrachlorpyranthrone (prepared by leading gaseous chlorine into a solution of pyranthrone in chlorsulphonic acid in the presence of sulphur) and 17 parts of anhydrous sodium carbonate, and the whole is heated to boiling until the initial materials have been reacted. After working up in the usual manner, a dark powder is obtained which dissolves in concentrated sulphuric acid giving an olive-green coloration. The dyestuff dyes cotton currant-brown shades of excellent fastness properties from a blue-violet vat.

What we claim is:

1. A vat dyestuff of the pyranthrone series corresponding to the general formula

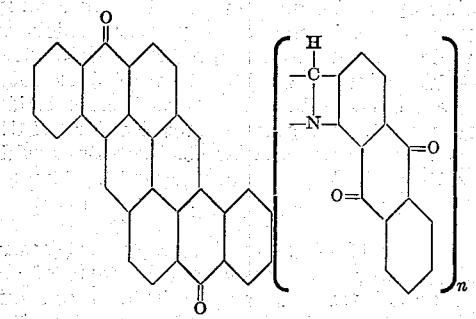

wherein $n$ is a member in the series of 1 to 4 and the pyranthrone nucleus may contain up to three halogen atoms selected from the class consisting of chlorine and bromine atoms, which dyestuffs dye cotton from the vat in shades ranging from red-brown to violet-brown, and are identical with the products obtained by heating a halogenated pyranthrone containing up to four halogen atoms, the halogen atoms being selected from the class consisting of chlorine and bromine with at most four molecular proportions of 1-aminoanthraquinone-2-aldehyde in presence of an inert diluent, an acid-binding agent and a copper compound at temperatures of about 200° C., said halogenated pyranthrones being obtained by halogenating pyranthrone until at most four halogen atoms have been introduced.

2. The vat dyestuff of the pyranthrone series corresponding to the general formula

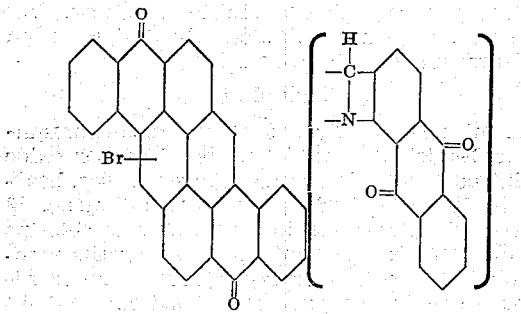

said dyestuff being soluble in concentrated sulfuric acid to give a blue coloration, and dyeing cotton red-brown shades from a red-violet vat and being identical with the product obtained by heating 1 mole of dibromopyranthrone with 1 mole of 1-amino-anthraquinone-2-aldehyde in presence of an inert diluent, an acid-binding agent and a copper compound at temperatures of about 200° C., said dibromopyranthrone being obtained by brominating pyranthrone until two bromine atoms have been introduced.

3. The vat dyestuff of the pyranthrone series corresponding to the general formula

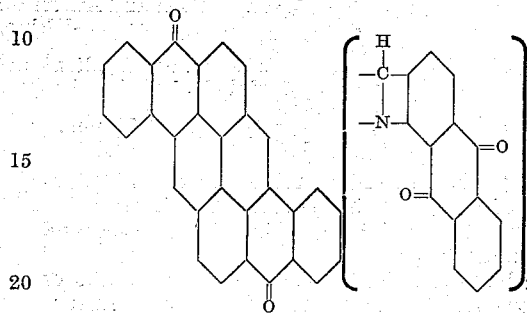

said dyestuff being soluble in concentrated sulfuric acid to give a grey-blue coloration, and dyeing cotton currant-brown shades from a reddish-violet vat and being identical with the product obtained by heating 1 mole of dibromopyranthrone with 2 moles of 1-amino-anthraquinone-2-aldehyde in presence of an inert diluent, an acid-binding agent and a copper compound at temperatures of about 200° C., said dibromopyranthrone being obtained by brominating pyranthrone until two bromine atoms have been introduced.

4. The vat dyestuff of the pyranthrone series corresponding to the general formula

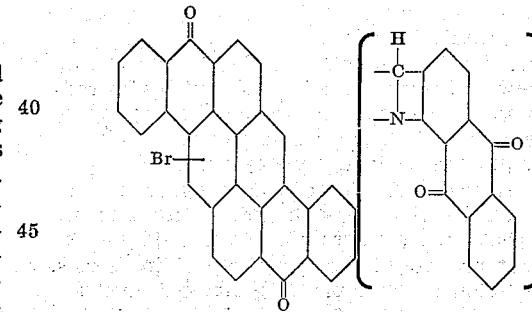

said dyestuff being soluble in concentrated sulfuric acid to give an olive-green coloration, and dyeing cotton currant-brown shades from a red-violet vat, being identical with the product obtained by heating 1 mole of tribromopyranthrone with 2 moles of 1-amino-anthraquinone-2-aldehyde in presence of an inert diluent, an acid-binding agent and a copper compound at temperatures of about 200° C., said tribromopyranthrone being obtained by brominating pyranthrone until three bromine atoms have been introduced.

KARL SAFTIEN.
ANTON VILSMEIER.

REFERENCES CITED

The following references are of record in the file of this patent:

UNITED STATES PATENTS

| Number | Name | Date |
| --- | --- | --- |
| 1,801,709 | Zerweck et al. | Apr. 21, 1931 |
| 1,861,921 | Honold | June 7, 1932 |

FOREIGN PATENTS

| Number | Country | Date |
| --- | --- | --- |
| 145,888 | Switzerland | June 1, 1931 |
| 472,325 | Great Britain | Sept. 22, 1937 |